(No Model.)

D. HAZARD.
CAR BRAKE.

No. 516,636.  Patented Mar. 13, 1894.

WITNESSES.
B. O. Pearl
M. L. Raymond

INVENTOR.
Dexter Hazard
By
Frederick O. Pearl & Benjamin O. Pearl
ATTORNEYS.

UNITED STATES PATENT OFFICE.

DEXTER HAZARD, OF MARQUETTE, MICHIGAN, ASSIGNOR OF ONE-HALF TO FREDERICK O. CLARK, OF SAME PLACE.

CAR-BRAKE.

SPECIFICATION forming part of Letters Patent No. 516,636, dated March 13, 1894.

Application filed October 26, 1893. Serial No. 489,177. (No model.)

*To all whom it may concern:*

Be it known that I, DEXTER HAZARD, of Marquette, in the county of Marquette and State of Michigan, have invented a new and novel device for setting brakes on car-wheels on steam-railways and street-car lines and to make the power for setting and holding said brakes more speedy and efficient with less effort on the part of the operator, thereby causing the brakes upon said car-wheels to be more efficient and reliable, rendering travel safer upon steep grades, of which the following is a specification.

My invention has for its object, First: The production of a mechanism that will control and stop the momentum of a steam railway car or street car. Second: A mechanism that can be applied more quickly than the hand brake now in use. Third: A mechanism that can be applied with a greater degree of certainty to accomplish the desired results above referred to, and that will often times prevent loss of life and property. Fourth: A mechanism that can be constructed and applied at very small cost, that will utilize the power which the momentum of a car produces, to set brakes as hereinafter described, and to hold them when so set without burning the friction wheel.

Figure 2:
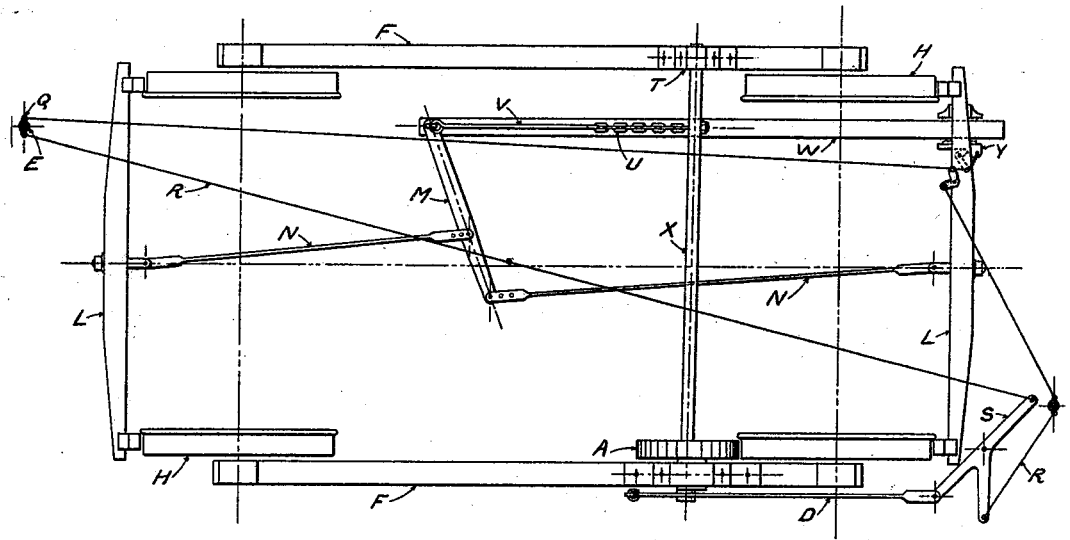
Figure 1:
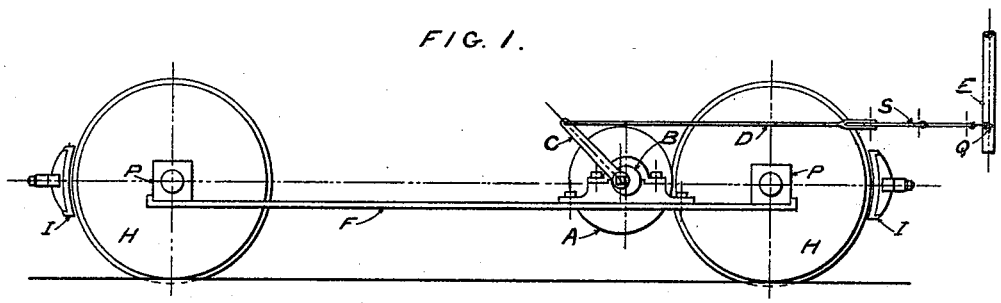

In the drawings: Figure 1 represents a side view of a car truck provided with my improvement. Fig. 2 is a plan view thereof.

"A" is a friction wheel; when in position is directly behind the car wheel "H."

"X" is a shaft to which friction wheel "A" is fastened.

"B" is an eccentric box, which holds shaft "X" in position.

"C" is a handle or short lever attached to the eccentric part of box "B."

"D" is a rod attached at one end to the handle "C."

"R R" are pieces of cable wire or chain, as may be desired, which are fastened to the rod "D," and to the upright rod "E" at the opposite end.

"W" is a flat bar which is connected at one end to the bar "M."

"Y" is a clutch in which the long flat bar "W" is placed. As the shaft "X" turns over and draws the short cross bar "M" forward, which sets the brakes, long bar "W" moves forward through the clutch "Y;" then the clutch "Y" closes and holds the brakes firmly to the wheel, until the clutch is opened by the operator.

Clutch "Y" is constructed by a flat plate, to which are attached upright side pieces that correspond in width to the thickness of bar "W." One of said side pieces is stationary on the bottom plate. The other side piece is held against the side of bar "W" and to the bottom plate by an eccentric, which is indicated by dotted lines, which opens as bar "W" moves forward and closes as bar "W" moves backward. This eccentric is held to the bottom plate by a bolt, which allows it to operate as described. To said eccentric is attached a short handle, to which is fastened a wire cable, which allows the operator to open the eccentric and release the clutch, which will relieve bar "W" and the brakes as may be desired. The clutch "Y" and bar "W" are necessary to hold the brakes when set, so as to allow the friction wheel "A" to be immediately released, so as to prevent the car wheel "H" from wearing flat spaces upon the face of friction wheel "A." This clutch "Y" is held in position by bolts, which go through the brake beams "L," and hold the clutch "Y" to the beams "L."

"S" is a piece of flat iron provided at one end with two projecting fingers. The rod "D" is attached at one end to one of these fingers. The wire cable "R" is attached to the other finger. "S" is fastened to the bottom of the car frame with a bolt, and is for the purpose of allowing the brake to be set from eithe end of the car.

"V" is a short rod connected by the short chain "U" to the shaft "X."

"M" is a flat cross bar.

"N N" are rods which connect the brake beams "L L" to the cross bar "M."

By the above mechanism, it will appear how the speed of a car can be controlled by throwing the friction wheel "A" against the car wheel "H," which will cause the shaft "X" to turn one revolution and the brakes are firmly set; and the bar "W" and clutch "Y" will hold the brakes and allow the friction wheel "A" to be released, and prevent its unnecessary wear by heating. This device will have practically unlimited power. It will give out power according to the pressure with which the friction is held against the car wheel, which can be increased or decreased at the will of the operator. Formerly this rod "V" and chain "U" have sometimes been connected to the upright rod "E" and the power to set the brakes has been limited to the amount which a man could pull turning a small hand wheel fastened to the top end of rod "E."

With my invention all the power that the momentum of a heavy laden car will give out, can be utilized to stop that momentum, by a very small amount of power, by turning the rod "E" part way around, or sufficient to turn the eccentric up. In fact, a small rope would be ample to turn the eccentric up, as the power in the eccentric box is so great, very little will be required to set the friction wheel firmly against the revolving car wheel, and the brakes will be instantly set and held until the clutch is released; which clutch can be released instantaneously, or gradually, at the will of the operator.

What I claim is—

1. The combination of car wheel "H," friction wheel "A," loose shaft "X," with wheel "A" fastened to shaft "X," shaft "X" being attached to cross bar "M," by chain "U" and rod "V," and bar "W;" which bar passes through clutch "Y;" which clutch "Y" is attached to brake beam "L;" rod "N" connecting cross bar "M" and brake beam "L," as shown and described.

2. The combination of car wheel "H," friction wheel "A," loose shaft "X," with wheel "A" fastened to shaft "X," and bar "W," which is attached to cross bar "M," and passes through clutch "Y;" which clutch is attached to brake beam "L;" shaft "X" being held to cross bar "M" by rod "V" and chain "U," as shown and described.

3. The combination of clutch "Y" attached to brake beam "L," with bar "W" passing through clutch "Y" and connected to cross bar "M," as shown and described.

DEXTER HAZARD.

In presence of—
B. O. PEARL,
M. L. RAYMOND.